United States Patent [19]
Reinartz et al.

[11] Patent Number: 5,484,194
[45] Date of Patent: Jan. 16, 1996

[54] SWITCH VALVE AND ACCUMULATOR ON PUMP DISCHARGE LINE FOR PRESSURE CONTROL DURING TRACTION CONTROL

[75] Inventors: Hans-Dieter Reinartz, Frankfurt am Main; Erhard Beck, Weilburg, both of Germany

[73] Assignee: ITT Automotive Europe GmbH, Germany

[21] Appl. No.: 256,805

[22] PCT Filed: Dec. 17, 1992

[86] PCT No.: PCT/EP92/02938

§ 371 Date: Jul. 25, 1994

§ 102(e) Date: Jul. 25, 1994

[87] PCT Pub. No.: WO93/14961

PCT Pub. Date: Aug. 5, 1993

[30] Foreign Application Priority Data

Jan. 23, 1992 [DE] Germany .............. 42 01 732.7

[51] Int. Cl.⁶ .................................................. B60T 8/48
[52] U.S. Cl. ................................ 303/116.2; 303/113.2
[58] Field of Search ........................ 303/11, 113.2, 303/113.3, 113.4, 116.1, 116.2, 901

[56] References Cited

U.S. PATENT DOCUMENTS

| | | | |
|---|---|---|---|
| 5,013,097 | 5/1991 | Gutzeit et al. | 303/116.2 |
| 5,288,142 | 2/1994 | Burgdorf | 303/113.2 |
| 5,335,981 | 8/1994 | Volz et al. | 303/116.2 X |

FOREIGN PATENT DOCUMENTS 3831426  4/1989  Germany .

*Primary Examiner*—Josie A. Ballato
*Attorney, Agent, or Firm*—Gossett Dykema

[57] ABSTRACT

A brake pressure control unit for use in an anti-lock brake control system and that includes the capability of providing traction slip control. An accumulator is connected through a switch valve to a pressure line on the discharge side of a pump. The switch valve is opened when a braking operation is initiated during a traction slip control action. The accumulator, which accommodates a corresponding volume of hydraulic fluid, is provided in order to ensure the hydraulic fluid supplied to the brake circuit during traction slip control cannot return to the reservoir and damage the master cylinder sleeve.

4 Claims, 2 Drawing Sheets

5,484,194

SWITCH VALVE AND ACCUMULATOR ON PUMP DISCHARGE LINE FOR PRESSURE CONTROL DURING TRACTION CONTROL

The invention is related to brake pressure control apparatus, and in particular for traction slip control of the driven wheels.

An apparatus of this kind is generally known from the German patent application published without examination, No. 3,831,426.

A hydraulic brake unit with anti-lock control system working by the recirculating principle is illustrated. In order to be able to utilize this unit also for the traction slip control, it is proposed to provide both a separating valve in the brake piping with the aid of which the master cylinder allows to be cut off from the brake circuit and a lockable connection between the suction side of the pump and the reservoir.

The rotational behavior of the driven wheels is monitored by means of sensors. If it becomes evident that a driven wheel is about to race, then the unit switches into the traction slip control mode. For this purpose the master cylinder is cut off from the brake circuit and the connecting line is opened. The pump aspirates hydraulic pressure agent from the reservoir and conveys it into the wheel brake. The brake pressure that has been built up generates a brake torque which counteracts the driving torque whereby a deceleration of the :racing wheel is achieved.

In traction slip systems the wheel brake pressure must be adjusted by modulating valves (inlet valve, discharge valve) in such a manner that the driving forces can be transmitted in an optimum way.

However, in the earlier referred to brake unit the following problem exists. In some cases, the driver may attempt to operate the brake at the same time the traction slip controller is engaged in traction slip control action. In that case hydraulic pressure agent is displaced out of the master cylinder toward the wheel brake through a non-return valve which is connected in parallel with the separating valve. When the brake pedal is actuated and the accelerator pedal is released the driving torque will be reduced so that there will no longer be any need for a traction slip control.

It can, moreover, be imagined that during the braking operation a brake slip control action is required since the braked wheel may threaten to lock. According to the recirculating principle the pump delivers the hydraulic pressure agent let off from the wheel brake back into the master cylinder. In the brake circuit there is, however, not only pressure agent from the master cylinder but also pressure agent which has been conveyed before by the pump into the brake circuit from the reservoir during the traction slip control action. This quantity of hydraulic pressure agent, too, will now be delivered back into the master cylinder, so that the piston will be urged back into its normal position. In that event a connection to the reservoir will be opened up, so that the hydraulic pressure agent is allowed to flow off into the reservoir through the connection. In a master cylinder which is furnished with a sleeve/breathing-hole-bore-type valve the aforesaid procedure will cause the sleeve to be damaged because the latter will be slid at high pressure across the breathing hole bore.

It is, therefore, proposed according to the teachings of the present invention through a switch valve to connect a transitional accumulator to the discharge side of the pump. The switch will be in the closed condition during a traction slip control action.

This valve may be actuated electromagnetically or hydraulically, in which case the master cylinder pressure may be utilized as the control pressure.

It can, furthermore, be imagined that constructionally the switch valve is combined with the valve in the connecting line.

DETAILED DESCRIPTION OF THE PREFERRED EMBODIMENTS

Figure 1:
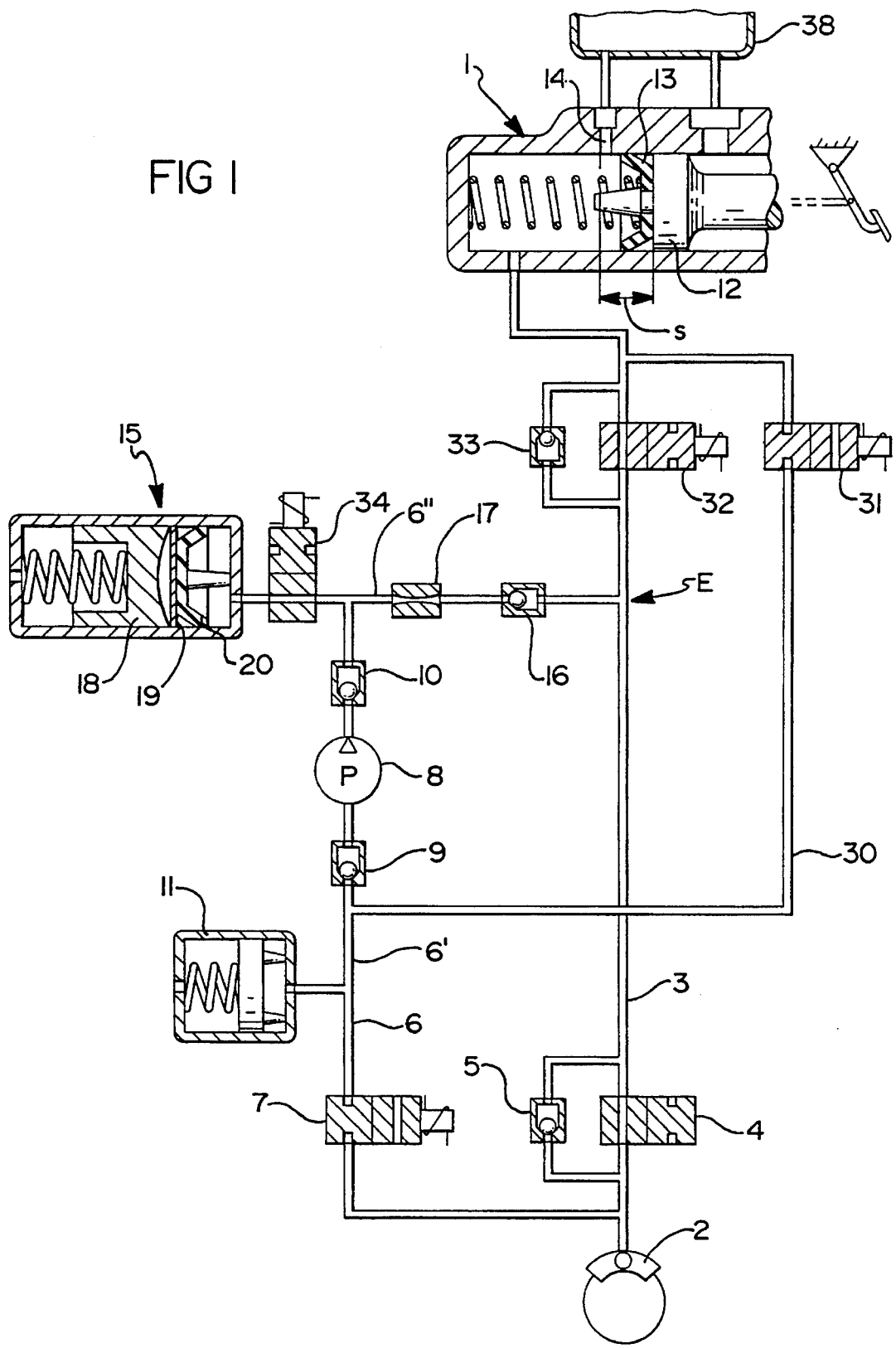
FIG. 1 shows the hydraulic connecting diagram of the brake apparatus of the present invention.

First of all, reference is made to FIG. 1, illustrating at first those elements which are of importance for a normal braking operation and for a traction slip control action.

The brake unit is composed of a master brake cylinder 1 to which a wheel brake 2 is connected through a brake piping 3. An inlet valve 4 is inserted in said brake piping 3 which keeps the brake piping open in its normal position and locks the brake piping in its switching position. A non-return valve 5 which opens toward the master cylinder is connected in parallel with the inlet valve. Said non-return valve affords at once to decrease the pressure in the wheel brakes when the actuating force acting on the master cylinder 1 is reduced.

The wheel brake 2 is also ,in connection with the master brake cylinder through the reflux line 6. A pump 8 with a suction valve 9 and a discharge valve 10 is inserted in line 6. Between the wheel brake 2 and the pump 8 an outlet valve 7 is inserted which locks the reflux line 6 in its normal position and which releases the reflux line 6 in its switching position. To the suction side of said pump, that is to say, between the suction valve 9 and the outlet valve 7, a low-pressure accumulator 11 (called reflux accumulator) is connected. Accumulator 11 stores pressure agent which is not immediately delivered forth by the pump 8.

The master brake cylinder 1 is furnished with a piston 12 which is connected to a (symbolically illustrated) pedal. To the piston 12 a sleeve 13 is fixed which in the normal position of the piston shown in the drawing is positioned directly before an outlet bore 14 being connected to the reservoir 38. In the normal position of the piston 12 a connection exists, therefore, between said reservoir 38 and the brake circuit. When the piston 12 is slid (to the left as viewed in the drawing) under the effect of the pedal force, the sleeve 13 will pass over the outlet bore 14, so that the brake circuit comes to be separated from the reservoir and a pressure can be built up in the brake circuit. The distance or travel between the normal position of the piston 12 and the position in which the sleeve has completely passed over the outlet bore 14 is denominated "s".

The brake unit which has been described so far is, now, furnished with a further accumulator (called transitional accumulator 15 in the following). According to FIG. 1 the latter is connected to the pressure range 6" (between the pump and the master brake cylinder) of the reflux line 6. It is comprised of a piston 18 and of a sleeve 20 which separates the accumulator chamber in respect of the atmosphere. The sleeve 20 is supported at a leaf spring 19 between the piston 18 and the sleeve. The leaf spring 19 can come into abutment in a bulge at the bottom of the piston. This provision is to prevent noise emissions. The piston 18 is subject to the action of a spring being prestressed only at a slight extent. In the pressure range 6" of the reflux line 6 there are a restrictor 17 and a non-return valve 16 in the range between the transitional accumulator 15 and the point where the reflux line 6 terminates into the brake piping 3. The two elements are connected one downstream of the other. The non-return valve 16 prevents that in the event of a braking operation which is not subject to a control action pressure agent may invade the transitional accumulator 15.

The brake unit of the present invention works according to the following scheme.

By actuating the pedal, a pressure is built up in the wheel brake 2. Sensors monitor the rotational behavior of the wheel, so that a risk of locking can be detected. If and when there is a risk of locking the unit will switch over to the anti-locking mode. The pump 8 will run during the anti-locking mode. For the reduction of the pressure in the wheel brake the inlet valve 4 will now be closed and the outlet valve 7 will be opened. As a result, pressure agent will be conveyed out of the wheel brake into the reflux accumulator 11 and will at first be delivered from there into the transitional accumulator 15 by means of said pump.

As long as said accumulator 15 is not totally filled only a slight pressure will exist upstream of the non-return valve 16, since the spring of the transitional accumulator 15 has only a slight prestress. As soon as the transitional accumulator 15 is entirely filled the piston 18 will abut a rear stop, so that now the pressure before the non-return valve 16 will rise. As soon as the pressure of the master brake cylinder has been reached pressure agent will flow through the non-return valve 16 to the master brake cylinder. The accumulator 15 cannot be emptied during this while because this would result in a decrease of the pressure upstream of the non-return valve 16, which pressure would, therefore, not be capable of opening the non-return valve contrasting the pressure in the master brake cylinder. That means, as long as a control action is under way and there is a pressure within the master brake cylinder the transitional accumulator 15 will remain filled. Only when the pedal is released and the pressure in the master brake cylinder decreases will the spring of the transitional accumulator 15 be capable of sliding the piston 18 and of delivering the pressure agent which exists in the transitional accumulator 15 into the master brake cylinder 1. During this procedure the sleeve will pass across the outlet bore 14 without pressure, so that no damage may occur.

Additional elements will be required in order to be able to realize a traction slip control action with the described brake unit. First of all a connecting line 30 has to be provided between the master brake cylinder 1 and the suction side of the pump 8, in which line a 2/2-way valve 31 is inserted. This valve is called traction slip control valve in the following.

Furthermore, a separating valve 32 is envisaged in the brake piping 3, precisely speaking between the master brake cylinder 1 and the point E where the pressure line 6" terminates into the brake piping 3. Valve 32, in the illustrated embodiment, is a solenoid actuated valve.

The accumulator 15 is connected to the pressure line 6" through a switch valve 34. A non-return valve 33 is in parallel with said separating valve 32. In the event of a traction slip control action the separating valve 32 will be closed and the traction slip control valve 31 will be opened. The pump can now aspirate pressure agent out of the reservoir 38 through the bore 14 and the open traction slip control valve 31 and deliver it into the brake piping 3 downstream of the separating valve 32. During this procedure a wheel brake pressure is being built up which can be modulated with the aid of the inlet valve 4 and of the outlet valve 7 and be adjusted such that the driving torque acting upon the wheel is compensated to such an extent that the remaining torque can be transmitted to the roadway by the frictional forces between the tires and the roadway without racing of the wheels.

The switch valve 34 is in the closed condition during a traction slip control action. It will be opened only if and when the pedal is operated during a traction slip control action which can, for example, be found out by a pedal travel sensor not shown in the drawing.

The pressure agent which has been conveyed into the brake circuit during a traction slip control action will then be delivered by the pump 8 not into the master cylinder but into the accumulator 15, so that any damaging of the sleeve 13 will be avoided in this way.

The holding volume of the accumulator 15 will have to be increased for this purpose. The accumulator will now not only have to accommodate the volume of pressure agent corresponding to the pedal travels but basically the volume of pressure agent which the brake circuit can accommodate.

In order that during a brake slip control action which does not immediately succeed a traction slip control action the withdrawal of volume by the accumulator 15 does not become excessive, the latter can be furnished with a switch, so that the switch valve can be locked during a brake slip control action as soon as the accumulator 15 has accommodated a volume corresponding to the slide travel s of the piston 12.

Figure 2:
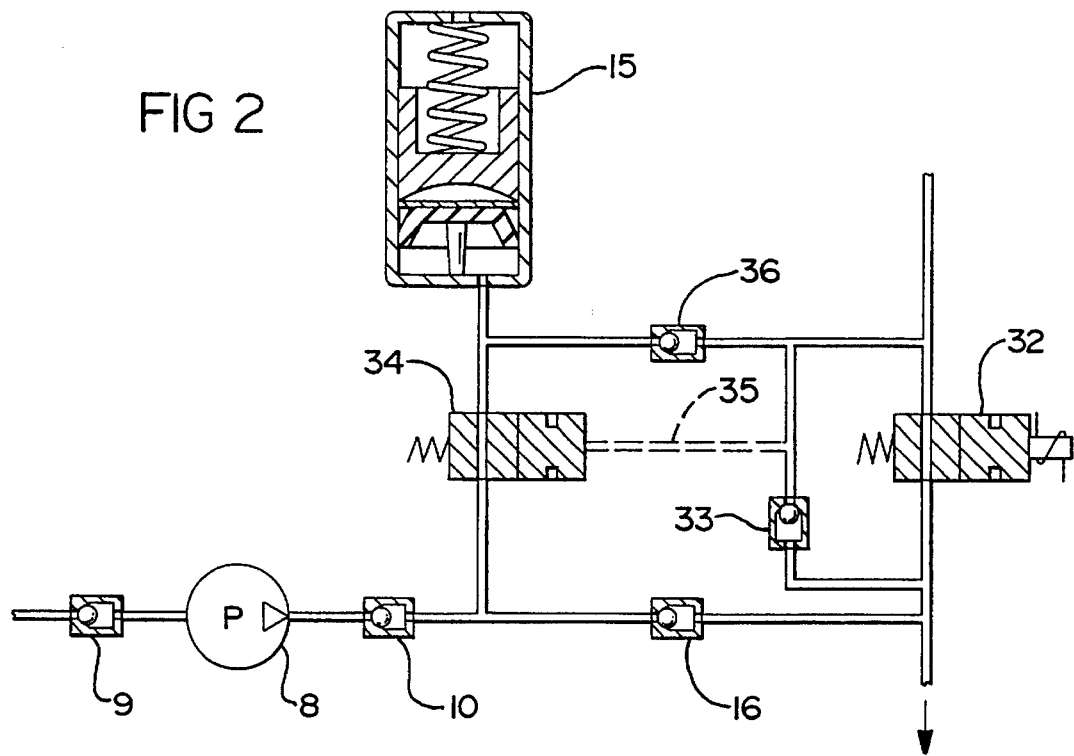
FIG. 2 shows a section of the hydraulic connecting diagram in FIG. 1 with a hydraulic actuation of the switch valve.

FIG. 2 shows a hydraulic actuation of the switch valve 34. The actuation takes place over a control line 35 which is connected to the master cylinder. A non-return valve 36 is, furthermore, envisaged which shuts off in the direction of the accumulator 15. The non-return valve is situated in a line which is either connected to the master cylinder or, else, to the range of the pressure line 6" between the discharge valve 10 and the non-return valve 16. The non-return valve 36 safeguards that the accumulator 15 is being emptied when the brake unit is pressureless.

Figure 3:
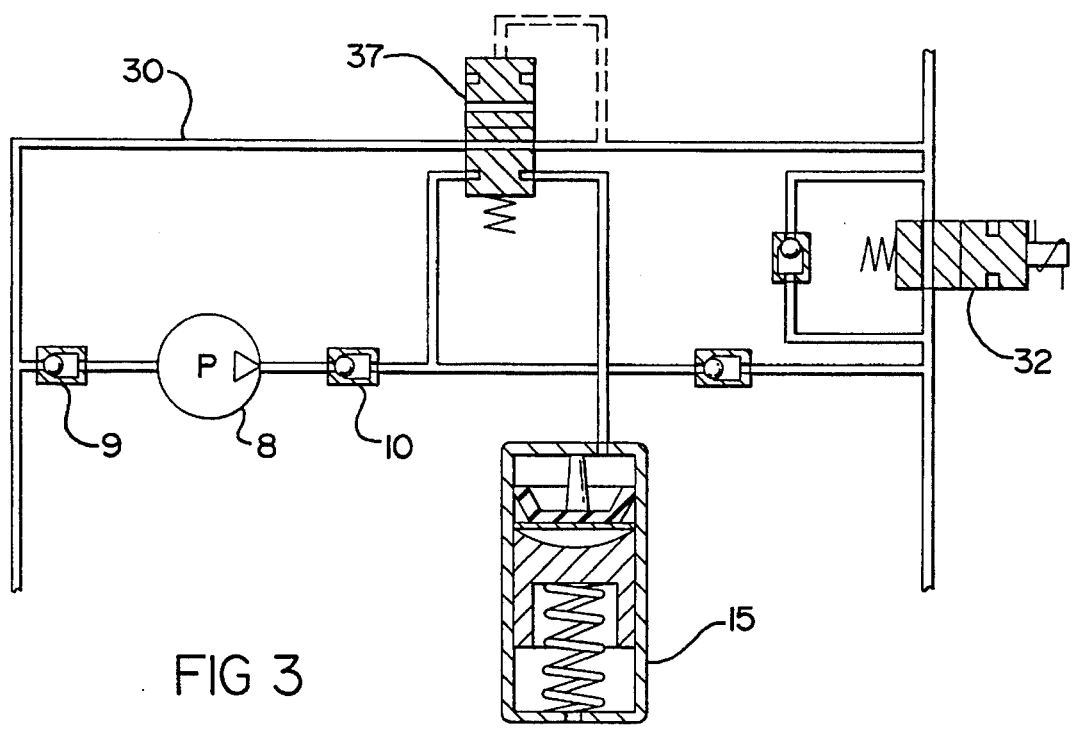
FIG. 3 shows a variant of FIG. 2.

In FIG. 3 a combination of the switch valve 34 and the traction slip control valve 31 is shown. It is configurated as a 4/2-way valve 37, the line leading to the accumulator 15 being shut off in the normal position and the connecting line 30 being open. As soon as a pressure is being built up within the master cylinder the combination valve 37 will be switched over, so that the line leading to the accumulator 15 will be opened and the connecting line 30 will be shut off.

We claim:

1. A brake pressure control unit, in particular for providing traction slip control, comprising:

a master cylinder connected to at least one wheel brake through brake piping, said wheel brake being associated with a driven wheel, said master cylinder having a piston adapted to move longitudinally within said master cylinder and a seal associated with said piston;

a pedal adapted to be depressed by a vehicle operator, said pedal being operatively coupled with said piston such that depression of said pedal causes said piston and seal to move within said master cylinder;

a pressure line connected to an inlet point of said brake piping;

a pump that delivers fluid through said pressure line;

a separating valve between said inlet point of said brake piping and said master cylinder;

a connecting line between said master cylinder and a suction side of said pump;

a traction slip control valve inserted in said connecting line;

a transitional accumulator connected to said pressure line; and a switch valve connected to said pressure line between said accumulator and a discharge side of said pump, said switch valve being in a closed position during a traction slip control action to thereby isolate said accumulator from said pressure line during said traction slip control action, said switch valve opening during a traction slip control action when said pedal is depressed such that fluid within said pressure line is delivered into said accumulator, to thereby prevent damage to said seal in said master cylinder.

2. A control unit as claimed in claim 1, wherein said switch valve is switchable from the closed position into an open position by pressure of said master cylinder.

3. A control unit as claimed in claim 1, wherein said switch valve and said traction slip control valve are constructionally united to form one 4/2-way-combination valve.

4. A control unit as claimed in claim 1, wherein said accumulator has a holding volume that is adapted to contain an amount of fluid equal to a total amount of fluid within the brake piping and the pressure line.

* * * * *